G. WHITLOCK.
Revolving Harrow.
No. 2,163.
Patented July 10, 1841.
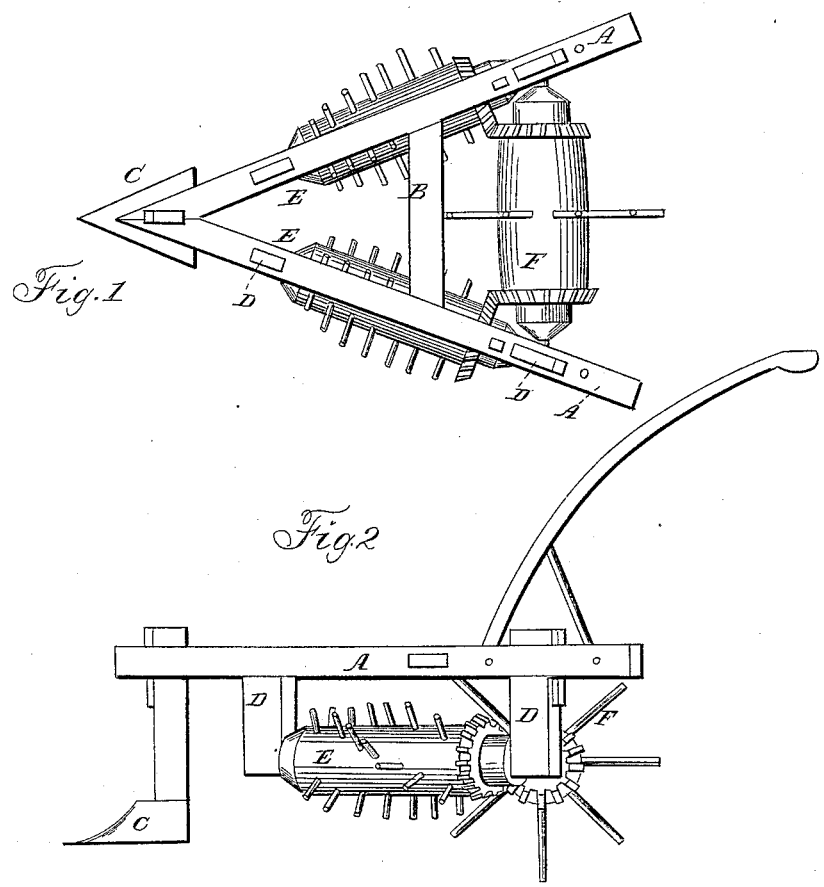

UNITED STATES PATENT OFFICE.

GEORGE WHITLOCK, OF CROWN POINT, NEW YORK.

IMPROVEMENT IN AGRICULTURAL MACHINE CALLED THE "REVOLVING CULTIVATOR."

Specification forming part of Letters Patent No. 2,163, dated July 10, 1841.

*To all whom it may concern:*

Be it known that I, GEORGE WHITLOCK, of Crown Point, in the county of Essex and State of New York, have invented a new and useful Agricultural Implement called the "Revolving Cultivator," for plowing and loosening the earth between rows of corn, &c., digging potatoes, and other purposes, which is described as follows, reference being had to the annexed drawings of the same, making part of this specification.

Figure 1 is a top view of the machine. Fig. 2 is a side elevation of the same.

Similar letters refer to corresponding parts.

The sides A A of the frame of this cultivator are the same as the sides of an isosceles-triangled frame, the base being omitted. Midway between the angular point and the outward extremities of the sides A is framed a cross-piece, B, for strengthening the frame, and forms a figure like the letter A. A common shovel-plow, c, is fixed to the angular point of the frame.

Four hanging timbers, D D D D, extending down about two thirds the depth of the plow, are mortised and tenoned into the sides A of the frame, two immediately behind the plow and two near the outer extremities of the sides A, there being two of said hanging posts in each side A, between which and directly under the sides A is made to revolve a circular harrow, E, on gudgeons in boxes or apertures in said posts, by means of bevel or other gear on the hinder ends of said harrows meshing into other similar gear on the extremities of a transverse revolving harrow, F, whose gudgeons turn in the inner sides of the rear hanging posts by means of a circular row of teeth inserted in said transverse cylinder coming in contact with the ground as the machine is moved forward and causing said harrow to revolve toward the plow, which causes the side harrows to revolve simultaneously toward each other, at the same time throwing the weeds, &c., from them, and to loosen the earth; and in plowing potatoes to uncover and expose them more effectually, their teeth being inserted in serpentine rows on the convex surfaces of the cylinders forming the said side harrows.

A gearing of cogs and mortises would perhaps be preferable to bevel-gearing, as not so liable to become clogged.

The machine is drawn by animal and guided by manual power, the handles being of the usual form of those in harrows of the common construction.

What I claim as my invention, and which I desire to secure by Letters Patent, is—

The arrangement of the side and transverse revolving harrows, operated in the manner set forth, in combination with the frame and plow, as before described.

GEORGE WHITLOCK.

Witnesses:
 RICHD. REED,
 M. S. BREWSTER.